No. 780,918. PATENTED JAN. 24, 1905.
C. SEYMOUR.
SAW TABLE.
APPLICATION FILED APR. 29, 1904.

WITNESSES:
Edward Thorpe
Rev. G. Hoskins

INVENTOR
Charles Seymour
BY
ATTORNEYS

No. 780,918.

Patented January 24, 1905.

UNITED STATES PATENT OFFICE.

CHARLES SEYMOUR, OF DEFIANCE, OHIO, ASSIGNOR TO THE DEFIANCE MACHINE WORKS, OF DEFIANCE, OHIO.

SAW-TABLE.

SPECIFICATION forming part of Letters Patent No. 780,918, dated January 24, 1905.

Original application filed January 30, 1904, Serial No. 191,272. Divided and this application filed April 29, 1904. Serial No. 205,457.

*To all whom it may concern:*

Be it known that I, CHARLES SEYMOUR, a citizen of the United States, and a resident of Defiance, in the county of Defiance and State of Ohio, have invented a new and Improved Saw-Table, of which the following is a full, clear, and exact description, this being a division of the application for Letters Patent of the United States for a band-saw, Serial No. 191,272, filed by me January 30, 1904.

The object of the invention is to provide a new and improved saw-table arranged to permit convenient and accurate adjustment to allow the saw band or blade of the sawing-machine to make straight or beveled cuts on the work.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1:
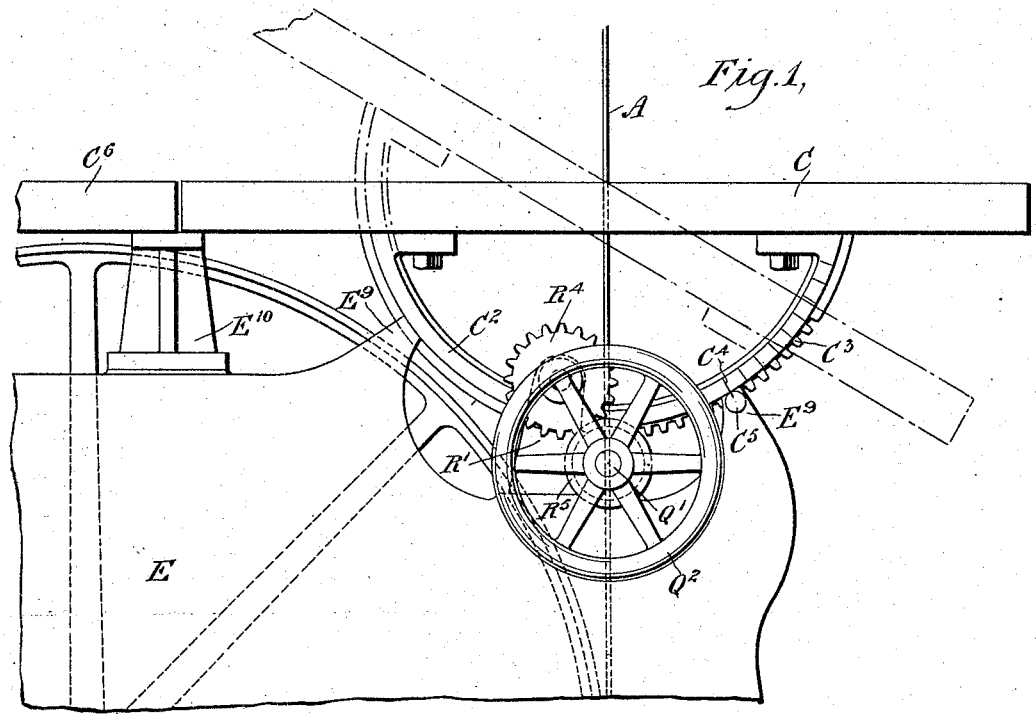
Figure 2:
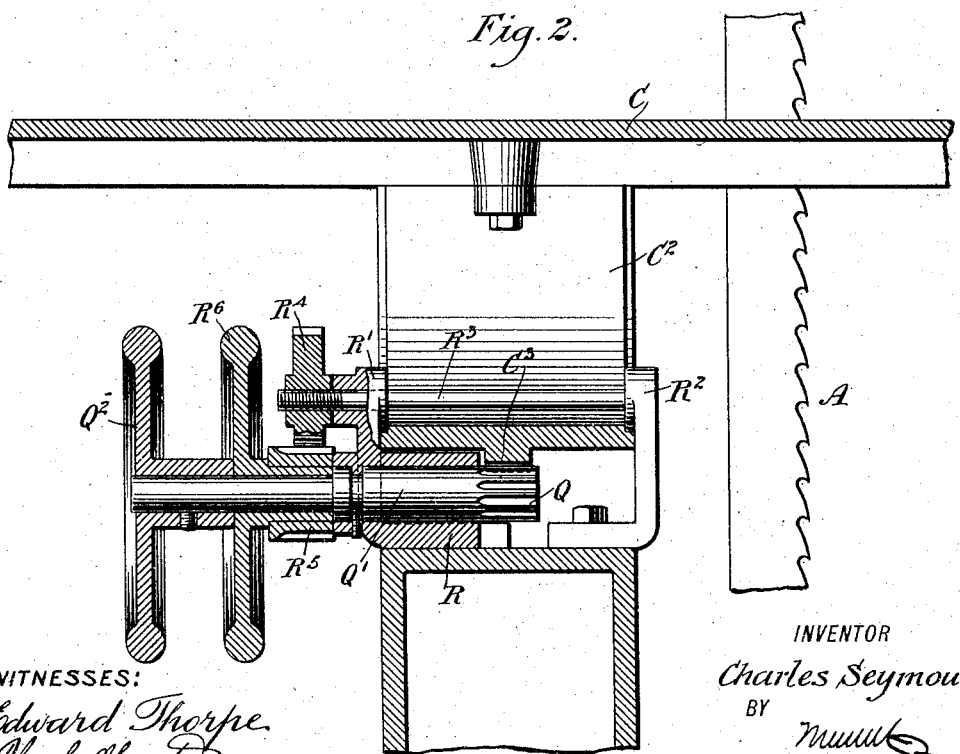

Figure 1 is a rear side elevation of the improvement as applied to a band-saw, and Fig. 2 is a transverse section of the same.

The work or feed table C is shown as a part of a band-saw having an endless saw band or blade A traveling over band-wheels and passing through a slot in the said work-table C, over which passes the work to be sawed by the cutting or downward run of the saw band or blade A.

For making straight cut the work-table C is held in a horizontal position, as shown in full lines in the drawings; but the work-table may be tilted to any desired angle (see dotted lines, Fig. 1) to allow of cutting the work at the bevel of a predetermined degree, and in order to permit such adjustment of the work-table the following arrangement is made: On the under side of the table C is secured or formed a segmental slide $C^2$, the center of which lies in the upper face or top of the table at the intersection with a vertical plane extending transversely through the cutting run of the saw-band A, as will be readily understood by reference to Fig. 1.

The segmental slide $C^2$ is mounted to move in correspondingly-shaped guideways $E^9$, forming part of the main frame E of the sawing-machine, and on the under side of the said slide $C^2$ is formed or secured a segmental rack $C^3$, in mesh with a pinion Q, fastened or formed on a shaft $Q'$, provided at its rear end with a hand-wheel $Q^2$ under the control of the operator for turning the shaft $Q'$ and the pinion Q, so as to cause the rack $C^3$ and the segment $C^2$ to travel, thereby tilting the table C to any desired degree.

In order to indicate the degree to which the table is tilted, the slide $C^2$ is provided at its rear edge with a graduation $C^4$, indicating degrees and subdivisions to be read on a pointer or fixed mark $C^5$, held on the main frame E, adjacent to the said slide $C^2$.

By the operator turning the hand-wheel $Q^2$ the table C can be tilted until the desired degree on the graduation $C^4$ coincides with the mark or pointer $C^5$, and then the table C is locked in this position, and for this purpose the following device is provided: The pinion-shaft $Q'$ is mounted to turn loosely in a bearing R, forming part of a jaw $R'$, adapted to engage one edge of the slide $C^2$, the opposite edge being adapted to be engaged by a resilient jaw $R^2$, bolted or otherwise secured to the main frame E. (See Fig. 2.) A screw-rod $R^3$ is rigidly connected with the upper end of the jaw $R^2$ and extends loosely through the upper end of the jaw $R'$, and on the threaded end of the said screw-rod $R^3$ screws a gear-wheel nut $R^4$, abutting against the jaw $R'$, so that when the screw-rod $R^3$ is screwed up the jaws $R^2$ and $R'$ are moved toward each other and in firm contact with the opposite edges of the slide $C^2$ to lock the latter in place. When the nut $R^4$ is turned in the opposite direction—that is, screwed outwardly—then the jaws $R'$ and $R^2$ are released to allow of moving the slide $C^2$ in its guideways $E^9$ on turning the hand-wheel $Q^2$, as previously explained. The jaw $R'$ is bolted to the main frame E, and the jaw $R^2$ is made in the form of an angle-iron, so as to yield sufficiently by its own resiliency for insuring a proper clamping of the slide $C^2$ by the jaws $R'$ and $R^2$, as before explained.

The nut $R^4$ is in the shape of a gear-wheel in mesh with a pinion $R^5$, secured or formed on the hub of a hand-wheel $R^6$, mounted to turn loosely on the pinion-shaft $Q'$, and when the hand-wheel $R^6$ is turned in one direction then the pinion $R^5$ turns the gear-wheel nut $R^4$ to move the jaws $R'$ and $R^2$ toward each other, as above explained, for locking the table C in a tilted position, and when the hand-wheel $R^6$ is turned in the opposite direction then the gear-wheel nut $R^4$ is unscrewed to release the jaws and the table C. The teeth of the pinion $R^5$ are sufficiently long to readily accommodate the sliding lateral movement of the gear-wheel nut $R^4$ when screwed up or when unscrewed on the screw-rod $R^3$.

When the table C is in a horizontal position, then its right-hand edge rests on a bracket $E^{10}$, forming part of the main frame E, the said bracket also supporting one side of a supplementary table $C^6$, resting at its other side on a lug on the main frame.

It is understood that when it is desired to cut the work at the bevel then the table C is unlocked by turning the hand-wheel $R^6$, as previously explained, and then the operator turns the hand-wheel $Q^2$ to swing the table into the desired angular position indicated by the pointer $C^5$ on the graduation $C^4$. When the desired position is reached, the table is again locked in the adjusted position by the operator manipulating the hand-wheel $R^6$ correspondingly, as before mentioned.

By mounting the table C as described it can be readily tilted to the desired position without affecting the position of the downward run of the saw-band A relative to the slot in the table C.

Having thus described my invention, I claim as new and desire to secure by Letters Patent—

1. A sawing-machine provided with a feed-table, a fixed bearing in which the feed-table is mounted to rock, clamping-jaws for holding the feed-table in place, one of the jaws being fixed and the other resilient, a manually-controlled screw-rod and nut therefor, the screw-rod being secured in the resilient jaw and extending loosely through the other jaw, and the said nut screwing on the screw-rod and abutting against the fixed jaw, the said nut being in the form of a gear-wheel, a manually-controlled pinion in mesh with the said gear-wheel nut, a manually-controlled pinion-shaft on which the said pinion is mounted to turn loosely, the said shaft being journaled in the said fixed jaw, a pinion on the said pinion-shaft, and a segmental rack fixed on the said table and in mesh with the said pinion on the pinion-shaft.

2. A sawing-machine provided with a feed-table, a fixed bearing in which the feed-table is mounted to rock, clamping-jaws for holding the feed-table in place, one of the jaws being fixed and the other resilient, a manually-controlled screw-rod and nut therefor, the screw-rod being secured in the resilient jaw and extending loosely through the other jaw, and the said nut screwing on the screw-rod and abutting against the fixed jaw, the said nut being in the form of a gear-wheel, a manually-controlled pinion in mesh with the said gear-wheel nut, a shaft, and means coöperating therewith for manually operating the feed-table, said pinion being supported on said shaft.

3. A sawing-machine provided with a feed-table having a fixed segmental slide with an exterior rack thereon, a fixed bearing in which the slide is mounted to rock, clamping-jaws for engaging opposite sides of the slide to hold the feed-table in place, one of the jaws being fixed and the other resilient, a manually-controlled screw-rod and nut therefor, the screw-rod being secured at one end in the resilient jaw and passing transversely across the slide at the inner side thereof and extending loosely through the other jaw, and the said nut screwing on the screw-rod and abutting against the fixed jaw, the said nut being in the form of a gear-wheel, a manually-controlled pinion in mesh with the said gear-wheel nut, and a shaft on the outer side of said slide, said shaft carrying said pinion and extending parallel with said screw-rod and having at its inner portion a pinion for engaging the exterior rack on the segmental slide.

4. A sawing-machine provided with a feed-table having a segmental rack, a fixed bearing in which the feed-table is mounted to rock, a clamp for holding the feed-table in place, a screw-rod and nut for operating the clamp, said nut being in the form of a gear-wheel, and a manually-controlled shaft having a pinion engaging the segmental rack to operate the feed-table and carrying a second pinion for engaging and operating said gear-wheel nut.

In testimony whereof I have signed my name to this specification in the presence of two subscribing witnesses.

CHARLES SEYMOUR.

Witnesses:
GEORGE W. DEATRICH,
JOS. BAUER.